Nov. 6, 1951   F. G. BURG   2,574,016
FLEXIBLE TOOL HOLDER
Filed Nov. 12, 1946
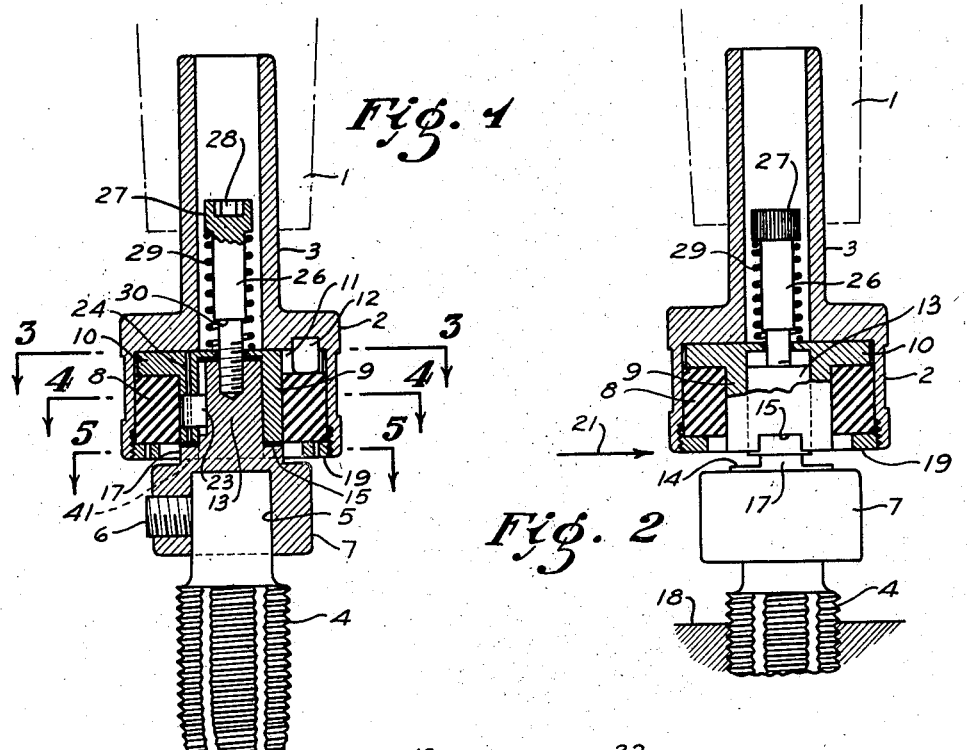
Fig. 1
Fig. 2
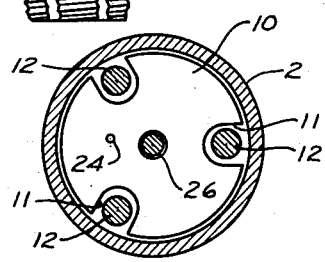
Fig. 3
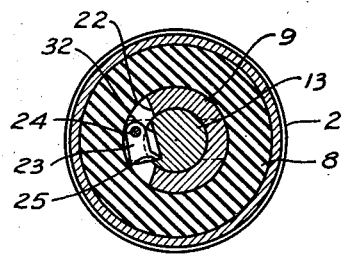
Fig. 4
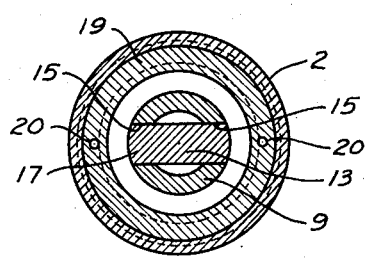
Fig. 5
INVENTOR
Fred G. Burg
BY John Flam
ATTORNEY Patented Nov. 6, 1951

2,574,016

UNITED STATES PATENT OFFICE 2,574,016

FLEXIBLE TOOLHOLDER

Fred G. Burg, Los Angeles, Calif.

Application November 12, 1946, Serial No. 709,190

3 Claims. (Cl. 10—89)

This invention relates to a tool holder, and particularly of the type described in an application filed on February 12, 1946, under Serial Number 647,079, in the name of Fred Burg, now Patent No. 2,525,646, granted October 10, 1950. This application is a continuation, in part, of the said prior application.

In that prior application, several forms of tool holders are described, in all of which the tool (such as a drill, tap or reamer) may automatically align itself with a guide aperture, even when there is a slight misalignment between the axis of the aperture and the axis of the tool. As an important feature of the structure, a rubber sleeve or coupling element is provided in the tool holder.

The present invention relates to a tool holder for performing threading or tapping operations. More particularly, the device is arranged to limit the axial advance of the tap or die with respect to the work; and after this limit is attained, the direction of rotation may be reversed to cause withdrawal of the tool from the work. When the drill press is used, the tool is rotated and fed to the work. In that case, the advance of the tool toward the work is limited in any appropriate manner; and the tool holder is so arranged that no rotary force is then effective, and rotation of the tool stops. However, reversal of rotation of the spindle serves to lock the tool and cause it to withdraw from the work.

When the tool is held in a turret of a turret lathe, the work rotates, and the turret is advanced. The turret, and tool advance to predetermined depths, and the tool then rotates with the work. Reversal of the rotation of the work serves to lock the tool and cause it to back out of the work.

It is one of the objects of this invention to provide a simple and effective tool holder capable of performing these functions.

It is another object of this invention to provide a tool holder that can be effectively used for a threading operation, although there may be a slight misalignment of the axis of the tap or die and the axis of the aperture or work upon which the threads are to be formed.

To effect these results, a one-way drive forms an element of the tool holder. It is still another object of this invention to provide a one-way drive that can be compactly arranged and in which use is made of the resilience of the rubber sleeve for maintaining the elements of the drive in operative relation.

This invention possesses many other advantages, and has other objects which may be made more clearly apparent from a consideration of one embodiment of the invention. For this purpose there is shown a form in the drawings accompanying and forming part of the present specification. The form will now be described in detail illustrating the general principles of the invention; but it is to be understood that this detailed description is not to be taken in a limiting sense, since the scope of this invention is best defined by the appended claims.

Referring to the drawings:

Figure 1 is a longitudinal sectional view of a tool holder embodying the invention, shown as supporting a tap;

Fig. 2 is a view, partly in section, taken from the right of Fig. 1, showing another position of the tool holder; and Figs. 3, 4, and 5 are sectional views, taken along the planes corresponding to the lines 3—3, 4—4, and 5—5 respectively.

The tool holder may be either rotary as in a drill press or non-rotary (as in a turret lathe). Thus, the tool holder may be rotated and fed downwardly as by the aid of a rotary spindle in a drill press, or supported in the turret of a turret lathe, and moved toward and from the work rotated by the lathe.

In the form shown in Figs. 1 and 2, the chuck or spindle of a drill press is indicated generally by the reference character 1. The tool holder itself includes an outer casing 2 having a hollow integrally formed stem 3 that may be tightly clamped in the device 1.

The tool being held in the tool holder is shown in this instance as a tap 4 fastened in a socket 5, which forms a part of the tool holder. This socket 5 is formed in a member 7, and set screw 6 serves to hold the tap 4 securely in place.

As in the prior application hereinabove identified, the coupling between the casing 2 and the tool is secured through a resilient plug-like member or sleeve 8. Accordingly, the tap 4 may readily accommodate itself to slight misalignment between the axis of the aperture being threaded and the axis of the tool holder. This accommodation of the tool to the work occurs whether the tap 4 is rotating or whether the work is rotating. The plug 8 encompasses a member 9 that is coaxial with socket 5. This member 9 has an upper flange 10, which has a clearance with the inside of casing 2.

In order to retain the rubber sleeve or plug 8 in place, it is held firmly against the lower surface of flange 10, as by the aid of the retaining ring 19 threaded into the lower end of the casing 2. Apertures 20 are provided for the accommodation of a spanner wrench for installing or removing the ring 19.

The flange 10 is also provided with a number of slots 11 (three being shown in this instance) in which the pins 12 extend. These pins 12 are firmly held in the top of casing 2 and have a slight clearance with the sides of the slots 11. In this way, only a limited relative rotation can occur between member 9 and the casing 2. Due to the resilient nature of the sleeve 8, and the above arrangement of slots, pins, and casing compensation is permitted for parallel and angular misalignment between the axis of the work and the axis of the driving spindle.

The member 7 has an upwardly extending projection 13. This projection 13 telescopes with the member 9. In this position, the members 7 and 9 are restrained against relative rotation. For this purpose the lower end of the member 9 is slotted, as shown most clearly in Fig. 5. The slot 15 extends diametrically across the member 9 and has parallel walls (see also Fig. 2).

Engaging the slot 15 is the corresponding key or projection 17, formed integrally with the members 7 and 13. This key is formed between the thin flange 14 and the cylindrical member 13 by cutting slots on opposite sides of the member 13. This provides shoulders corresponding to the upper surface of flange 14 between member 13 and key 17. With the projection 17 received in the slot 15, there can be no relative rotation between the members 7 and 9. However, should there be an axial separation, such as illustrated in Fig. 2, between the projection 17 and the slot 15, the members 7 and 9 are uncoupled, and relative rotation would be permitted. This uncoupling is caused to occur whenever the tap 4 reaches its desired depth in the work 18.

For example, assuming that the tap 4 is rotated and moved downwardly to thread an aperture in the work 18, the casing 2 may be brought downwardly to a level indicated by the arrow 21 of Fig. 2, beyond which the casing 2 is restrained from moving, although it may be rotating. This restraint may be accomplished by any appropriate stop. The member 7 however, is caused to move downwardly by the interengaging threads of the tap 4 and of the work 18. When this downward movement is sufficiently complete to free the projections 17 from the slot 15, as shown in Fig. 2, rotation of the casing 2 is no longer effective to rotate the tap 4, which has assumed its desired or predetermined depth in the work 18.

The setting of the stop for limiting downward movement of the casing 2 is such that feeding of the casing 2 to this limit, plus the depth of the slot 15, corresponds to the desired depth of the threading operation.

In order to remove the tap 4 from the work 18, it is necessary to reverse the direction of rotation of the tool holder. This reverse rotation is effected by the aid of a tooth and pawl coupling between the members 9 and 13. Thus, as shown most clearly in Figs. 1 and 4, the member 9 has a slot 22 for the accommodation of a pawl 23. This pawl is pivoted by the aid of a pin 24 extending longitudinally of the member 9. It is urged inwardly by the resilience of the encompassing rubber sleeve 8 and into operative driving engagement with a plane surface 25 formed in the stem 13 by a flat cut 32 normal to surface 25.

Assuming that the tap 4 is being rotated to cut threads in the work 18, the casing 2 is rotated in a clockwise direction, as viewed in Fig. 4. However, when the projections 17 are uncoupled from the slot 15 (as in Fig. 2), clockwise rotation of the casing 2 merely causes the pawl 23 to ride over the surface 32 without rotating stem 13. Accordingly, rotation in a clockwise direction of the tap 4 stops just as soon as the position of Fig. 2 is reached. Reversal of the direction of rotation of casing 2 effectively causes a corresponding reversal of rotation of tap 4 by engagement of the pawl 23 with the shoulder 25. The shoulder 25 extends longitudinally for a substantial distance along the periphery of the stem 13, and in this way the relative axial movement required to uncouple projections 17 from the slot 15 does not affect the coupling between pawl 23 and the shoulder 25.

As counter-clockwise rotation progresses, the first effect is to draw the projection 17 into the slot 15. Thereafter, the head 2 is again coupled to the tap 4 by this re-engagement.

A spring is used, constantly urging the members 7 and 9 toward coupling relation. Thus, for example, a screw 26 (Figs. 1 and 2) may be in threaded engagement with the upper end of the member 13, and extends into the hollow stem 3. This screw is provided with a head 27, having a socket 28 for the accommodation of a wrench. Between the head 27 and the upper surface of flange 19 a compression spring 29 may be provided. This compression spring serves to urge the member 13 upwardly with respect to the member 9. The extent of downward axial movement of member 7 is limited by the provision of the shoulder 30 on the screw 26, and which may engage the upper surface of flange 19. Upward axial movement of member 7 is limited by engagement of flange or boss 14 with the lower end of member 9 as indicated by the dotted line 41 of Fig. 1.

The operation of the tool holder, when utilized with a turret head, is quite similar to that already described. For such use of the tool holder, the tap 4 is advanced axially by the turret with respect to the work, and is not rotated. The work rotates in a counter-clockwise direction with respect to the tap 4. Advance of the turret toward the work is restrained at the position indicated by the arrow 21. Continued rotation of the work 18 then serves to uncouple the member 7 from the member 9. This uncoupling occurs when the projections 17 are free of the slot 15, as shown in Fig. 2. Thereafter, continued rotation of the work 18 merely serves to rotate the tap 4 along with it, while the member 9 is left stationary.

In order to withdraw the tap 4 from the work, the rotation of the work 18 is reversed. The pawl 23 is then effective to stop tap 4 from rotating. As this reverse rotation continues, the tap 4 is moved by the threads axially so as to cause a coupling between slot 15 and projections 17.

The inventor claims:

1. In a tool holder: a first member for receiving a tool shank; a second member; one of said members having an axis of rotation; one of said members having a slot transverse to said axis; and the other member having a projection fitting said slot to prevent relative rotation between the members until relative axial movement between said members causes the projection to be freed of the slot; and means forming a driving coupling for one of the members, including an outer casing forming an annular space with the exterior of one of said members; a resilient plug filling the annular space; and a slot and pin drive between the casing and said one member.

2. In a tool holder: a first member for receiving a tool shank; a second member; one of said members having an axis of rotation; one of said members having a slot transverse to said axis; and the other member having a projection fitting said slot to prevent relative rotation between the members until relative axial movement between said members causes the projection to be freed of the slot; said members having telescoping parts; the inner part forming a tooth elongated in the direction of said axis; a pawl cooperating with the tooth and mounted on the outer part; said pawl and tooth remaining in cooperative relationship upon separation of the projection and the slot; and means forming a driving coupling for the outer part, including an outer casing; and a resilient plug filling the annular space between the casing and said outer part and urging the pawl inwardly.

3. In a tool holder: a first member for receiving a tool shank; a second member; one of said members having an axis of rotation; one of said members having a slot transverse to said axis; and the other member having a projection fitting said slot to prevent relative rotation between the members until relative axial movement between said members cause the projection to be freed of the slot; said members having telescoping parts; the inner part forming a tooth elongated in the direction of said axis; a pawl cooperating with the tooth and mounted on the outer part; said pawl and tooth remaining in cooperative relationship upon separation of the projection and the slot; and means forming a driving coupling for the outer part, including an outer casing; a resilient plug filling the annular space between the casing and said outer part and urging the pawl inwardly; and a slot and pin drive between the outer casing and the outer part.

FRED G. BURG.

REFERENCES CITED

The following references are of record in the file of this patent:

UNITED STATES PATENTS

| Number | Name | Date |
|---|---|---|
| 726,674 | Goodrich | Apr. 28, 1903 |
| 809,257 | Hanson | Jan. 2, 1906 |
| 915,201 | Miller | Mar. 16, 1909 |
| 985,231 | Truman | Feb. 28, 1911 |
| 1,164,315 | Procunier | Dec. 14, 1915 |
| 1,294,428 | Drissner | Feb. 18, 1919 |
| 1,740,887 | Crosby | Dec. 24, 1929 |
| 2,340,477 | Kruse | Feb. 1, 1944 |
| 2,378,659 | Ross | June 19, 1945 |

FOREIGN PATENTS

| Number | Country | Date |
|---|---|---|
| 122,174 | Great Britain | June 19, 1919 |